United States Patent
Eickhoff

(12) 
(10) Patent No.: US 9,979,034 B2
(45) Date of Patent: May 22, 2018

(54) FUEL CELL BASED POWER GENERATOR AND FUEL CARTRIDGE

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 313 days.

(21) Appl. No.: 14/060,813

(22) Filed: Oct. 23, 2013

(65) Prior Publication Data

US 2015/0111120 A1 Apr. 23, 2015

(51) Int. Cl.
| | |
|---|---|
| *H01M 8/06* | (2016.01) |
| *H01M 8/04082* | (2016.01) |
| *C01B 3/06* | (2006.01) |
| *H01M 8/04746* | (2016.01) |

(52) U.S. Cl.
CPC ......... *H01M 8/04208* (2013.01); *C01B 3/065* (2013.01); *H01M 8/04201* (2013.01); *H01M 8/04216* (2013.01); *H01M 8/04753* (2013.01); *Y02E 60/362* (2013.01)

(58) Field of Classification Search
CPC .... H01M 8/06; H01M 8/065; H01M 8/04201; H01M 8/04753; H01M 8/04216; H01M 8/04208; H01M 8/04156
See application file for complete search history.

(56) References Cited

U.S. PATENT DOCUMENTS

| | | | |
|---|---|---|---|
| 2003/0228252 A1* | 12/2003 | Shurtleff | B01J 7/02 423/657 |
| 2008/0107930 A1* | 5/2008 | Eickhoff | H01M 8/04208 429/410 |
| 2009/0214904 A1* | 8/2009 | Zhou | H01M 8/04156 429/421 |
| 2010/0178573 A1 | 7/2010 | Eickhoff et al. | |
| 2010/0183954 A1* | 7/2010 | Karst | H01M 8/04171 429/515 |
| 2010/0247750 A1 | 9/2010 | Eickhoff et al. | |
| 2012/0094196 A1* | 4/2012 | Eickhoff | C01B 3/065 429/414 |
| 2012/0115054 A1 | 5/2012 | Wallace et al. | |
| 2013/0115536 A1 | 5/2013 | Barton | |

FOREIGN PATENT DOCUMENTS

EP 1845572 A1 10/2007

OTHER PUBLICATIONS

"European Application Serial No. 14186282.1, Extended European Search Report dated Jun. 3, 2015", 9 pgs.

(Continued)

*Primary Examiner* — Michael L Dignan
(74) *Attorney, Agent, or Firm* — Schwegman Lundberg & Woessner, P.A.

(57) ABSTRACT

A power generator includes a power generator cavity adapted to receive a fuel cartridge, a protrusion disposed with in the cavity to engage a check valve of the fuel cartridge, a fuel cell to convert hydrogen and oxygen to electricity and to generate water vapor, and a passage to transport hydrogen from the cavity to the fuel cell and water vapor to the cavity.

7 Claims, 4 Drawing Sheets

(56) References Cited

OTHER PUBLICATIONS

"European Application Serial No. 14186282.1, Office Action dated Feb. 27, 2015", 2 pgs.
"European Application Serial No. 14186282.1, Office Action dated Jul. 6, 2015", 2 pgs.
"European Application Serial No. 14186282.1, Response filed Jan. 2, 2016 to Extended European Search Report dated Jun. 3, 2015", 11 pgs.

* cited by examiner

FUEL CELL BASED POWER GENERATOR AND FUEL CARTRIDGE

BACKGROUND

Planar fuel cell based electrical power generators contain a gas permeable membrane which allows atmospheric gases access to a hydrogen generating fuel in a fuel cartridge, prior to insertion of the cartridge into the power generator.

During operation, water vapor generated by the fuel cells diffuses through the gas permeable membrane and reacts with the fuel to generate hydrogen. The hydrogen diffuses in the opposite direction back to the fuel cell where it is used to generate electricity and additional water vapor.

This configuration requires that a large surface area gas seal be formed around the perimeter of the cartridge, which is difficult to achieve in practice. Further, there is no way to completely eliminate the atmospheric gases that are admitted into the system when the cartridges are being replaced, creating a potentially dangerous mixture of hydrogen and oxygen.

SUMMARY

A power generator includes a power generator cavity adapted to receive a fuel cartridge, a protrusion disposed with in the cavity to engage a check valve of the fuel cartridge, a fuel cell to convert hydrogen and oxygen to electricity and to generate water vapor, and a passage to transport hydrogen from the cavity to the fuel cell and water vapor to the cavity.

A device includes a case having a cavity with perforations on a portion of the case adapted to allow passage of water vapor into the cavity, a water vapor responsive hydrogen producing fuel disposed within the cavity of the case, a selective gas impermeable water vapor permeable membrane disposed between the fuel and the perforations in the case to allow passage of water vapor, and a valve disposed at an end of the case to controllably allow hydrogen to flow outside the case.

A method includes removing a tear-away gas impermeable foil from a hydrogen producing fuel cartridge to expose to a water vapor permeable, gas impermeable membrane separating a hydrogen producing fuel from ambient, inserting the hydrogen producing fuel cartridge into a power generator cartridge cavity, and opening a valve in the fuel cartridge when inserting the cartridge into the cavity to form a passage for hydrogen from the fuel cartridge to flow to a fuel cell in the power generator.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
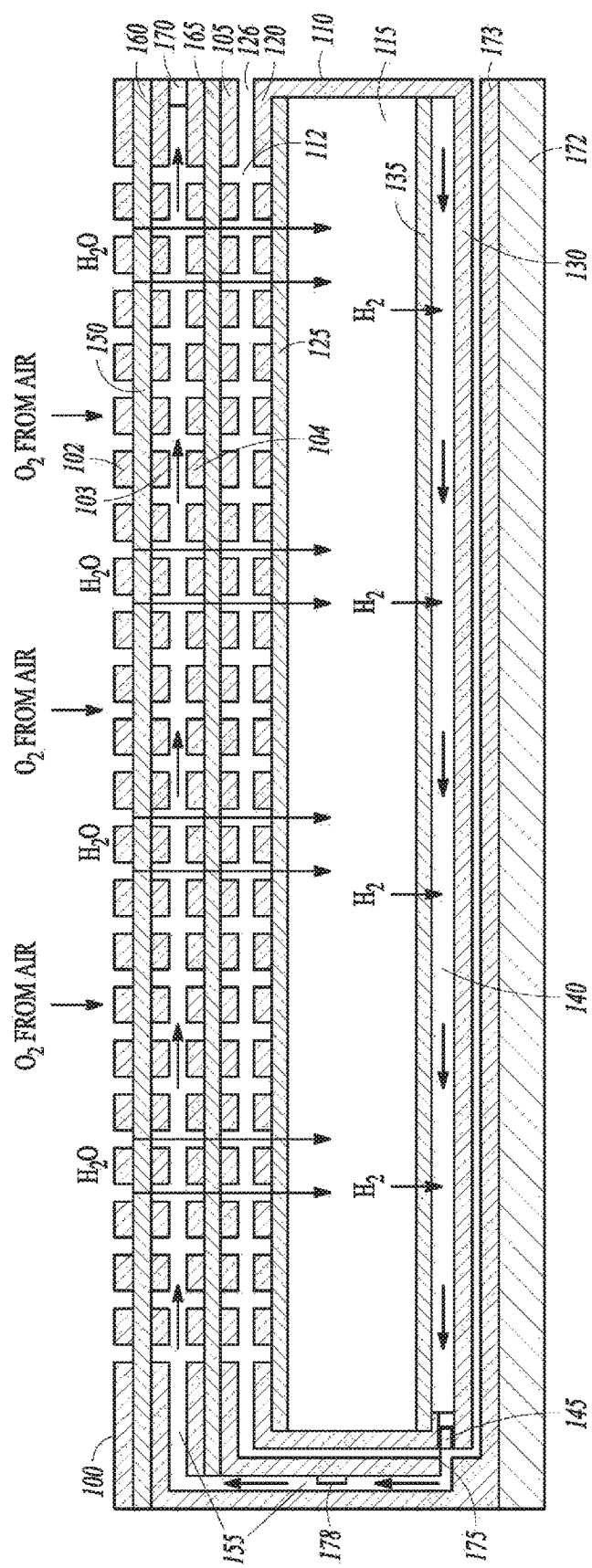
FIG. 1 is a block diagram cross section representation of a fuel cell based power generator with replaceable fuel cartridge according to an example embodiment.

A fuel cell based power generator 100 is shown in block diagram cross section form in FIG. 1. The power generator uses self-regulation, selectively permeable membranes (water permeable, atmospheric gas-impermeable such as NAFION) and an insertion actuated valve to isolate a hydrogen-generating fuel from atmospheric gases. The generator 100 structure may also prevent a potentially explosive mixture of gases from forming in the fuel cell system.

Figure 2:
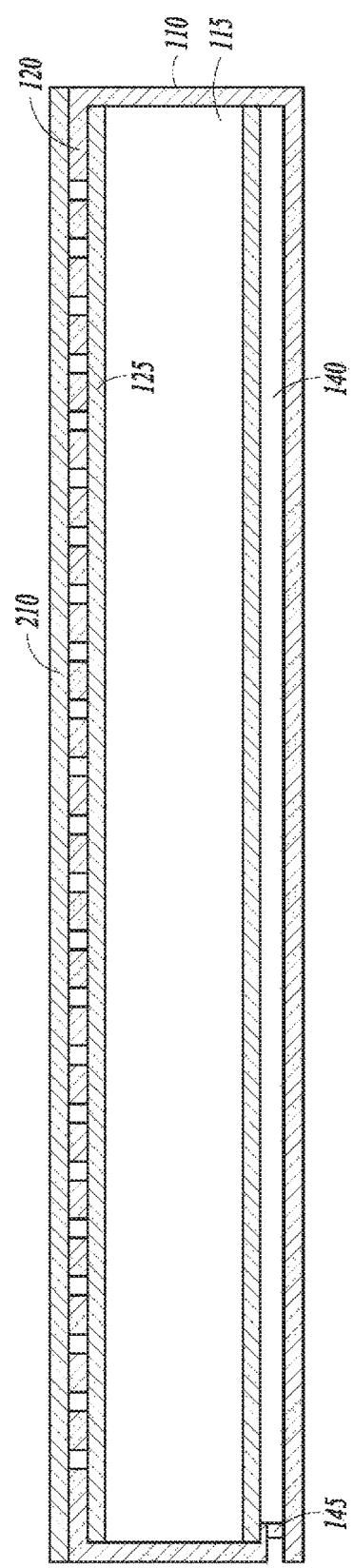
FIG. 2 is a block diagram cross section representation of a replaceable fuel cartridge for a fuel cell based power generator according to an example embodiment.

A removable fuel cartridge 110, also shown independently in FIG. 2 with consistent reference numbers, comprises a case (metal or polymer) containing a water-reactive hydrogen generating fuel 115. The cartridge 110 may be inserted into a power generator cavity 112. A side or face 120 of the cartridge is perforated, and exposes a selectively permeable membrane 125 (water vapor permeable, atmospheric gas impermeable) which separates the fuel 120 from the ambient environment 126. Inside cartridge 130 is a gas permeable particulate filter 135 and array of channels 140 which allow hydrogen to freely move laterally to a valve 145 that opens when the cartridge is inserted into the power generator. The channels are opposite the perforated side of the cartridge in one embodiment, such that water vapor is received at side 120 and permeates the fuel 115 and released hydrogen travels to the channels 140.

During operation, water vapor generated by fuel cells 150 permeates the selectively permeable membranes 165 and 125 due to the large concentration gradient between the humid fuel cell 150 and dry, water-reactive fuel 115. The water vapor reacts with the fuel 115 to generate hydrogen. The hydrogen is transported via the channels 140 to the valve 145, such as a check valve, which opens when inserted into the power generator 110 cavity 112. The hydrogen is transported via a power generator hydrogen transport channel 155 coupled to the channels 140 through the valve 145 to the fuel cell 150 where it is consumed to generate electricity and water vapor.

The hydrogen transport channel 155 runs between an anode 160 of the fuel cell 150 and another selectively permeable membrane 165 (water vapor permeable, atmospheric gas impermeable). At the end of the hydrogen transport channel 155 is an exhaust valve 170 which vents to ambient the small amount of atmospheric gases which do enter the system. The power generator 100 may be formed of polymer or metal in various embodiments, and includes multiple perforated plates 102, 103, 104, 105 to sandwich the fuel cell 150 and membrane 165. Power management electronics 172 may be disposed anywhere in the generator 100, and is shown supported by a bottom plate 173 of the generator, which together with perforated plate 105 supporting membrane 165, form cavity 112 into which the cartridge 110 is insertable.

The power generator 100 contains a check-valve and fuel cartridge interface 175 which automatically opens the valve 145 when the cartridge is inserted into the power generator 100, allowing hydrogen to flow from the fuel cartridge 110 to the fuel cell 150. In some embodiments, multiple valves may be provided on the fuel cartridge 110 with the power generator having multiple interfaces 175.

A small amount of nitrogen and other inert gases may permeate the power generator over time. It may be desirable to vent such gasses. The exhaust valve 170 may be a solenoid-controlled valve in one embodiment, which is actuated periodically to vent these gases. The decision to vent may be based on the fuel cell voltage, which declines over time as nitrogen builds up, or the pressure as detected via a pressure sensor exceeds a threshold. Venting may be performed periodically on a time schedule.

The fuel cell based power generator 100 in one embodiment is self-regulated during operation and therefore requires no valve to control hydrogen generation. Self-regulation occurs because increasing pressure in the fuel cartridge builds a pressure gradient in the membrane electrode assembly (MEA) which reduces water vapor back permeation, while at the same time increasing hydrogen permeation losses. An equilibrium pressure is eventually established which is dependent on the electrical load and ambient temperature and humidity.

In one embodiment, the power generator 100 and fuel cell 150 is generally planar in shape and may consist of multiple cells connected in series. As indicated, the fuel cell 150 is supported between plates 102 and 103 which contain perforations to allow air to reach the cathode portion of the fuel cell and hydrogen to reach the anode side of the fuel cell respectively. The power management electronics 172 may include a rechargeable battery, such as a Li-ion battery manufactured by Saft America Inc. The battery may be used to power the electronics and may also provide additional power during periods of high demand or transient fluctuations in power demand. The battery may be recharged utilizing electricity generated by the fuel cell. Other rechargeable or non-rechargeable batteries may be used in further embodiments. One or more sensors 178 may be included at various portions of the power generator 100 and coupled to the electronics 172 to provide temperature and/or pressure information for use in controlling various features, such as exhaust valve 170. A single sensor 178 is shown in block form in transport path 155 as an example of the one or more sensors. In further embodiments, the number and placement of sensors may vary as desired.

The fuel 115 may be formed of many different hydrides such as combinations of chemical hydrides, and combinations of chemical hydrides and metal hydrides may be used for the hydrogen producing fuel, such as for example alane $AlH_3$, $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or any combinations thereof that act as a water-reactive hydrogen-producing material that reacts with water vapor to produce hydrogen.

In one embodiment, the hydrogen producing fuel may be formed as pellets with a controlled porosity. The term pellet, is used in a broad sense to describe any shape or configuration of the hydride particles that occupy in the space allotted to the chemical hydride in the fuel source. Thus, the shape of the chemical hydride pellet is not critical. It may be a, layer, disk, tablet, sphere, or have no specific shape. The shape of the chemical hydride particles may be determined by the shape of the fuel source and the need to make the most efficient use of the space allotted to the chemical hydride. If appropriate, differently shaped chemical hydride pellets can be used within one fuel source.

The power generator may be formed in the size of a standard "AA", "AAA", "C", or "D" cell (or any other battery size) that can be removed and replaced. In further embodiments, the power generator may be positioned within a device to be powered in a manner that allows access to the fuel container to remove and replace it with a new or recharged fuel container and also allows access to ambient for providing oxygen to the fuel cell.

FIG. 2 illustrates a block cross section of the fuel cartridge 110 separated from the power generator 100. Prior to insertion of the fuel cartridge 110 into chamber 112 of the power generator 100, a tear-away gas impermeable foil 210 is disposed on an outside surface of the portion of the fuel cartridge face 120. The face 120 has openings or perforations that are covered by the foil 210 to prevent passage of gas to the fuel prior to insertion of the cartridge 120 into the power generator cavity 112.

Figure 3:
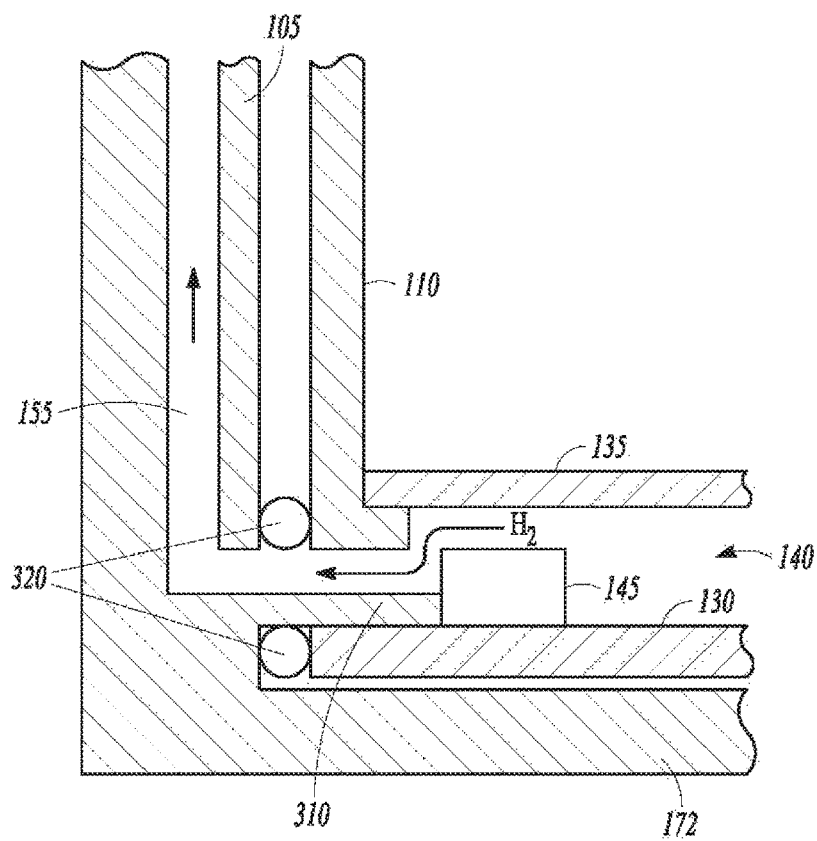
FIG. 3 is a block diagram illustrating operation of a fuel cartridge valve with a power generator according to an example embodiment.

FIG. 3 illustrates a portion of the cartridge 120 with respect to the power generator 100 cavity 112 when the cartridge 120 is inserted into the cavity 112. The power generator 100 includes a protrusion 310 that extends toward the fuel cartridge 110 and contacts the valve 145 to cause the valve to move further into the cartridge 110 and allow hydrogen to flow past the valve into the hydrogen transport path 155 of the power generator 100. The insertion of the cartridge into the cavity 112 also causes a seal to form between the channels 140 of the cartridge and the path 155. The seal may be formed via compressible members indicated at 320, such as a plastic or rubber ring shaped to sandwich between the opening from channels 140 and the opening to path 155. The corresponding openings form an area to seal that is much smaller than the area involved in trying to seal the entire cartridge into the power generator. A latch, not shown, may be used to retain the cartridge in position to maintain the valve 145 in the open position and to maintain the seal between the channel 140 and path 155. A friction fit between the cavity 112 and cartridge 120 may alternatively be used to retain the cartridge in position.

Figure 4:
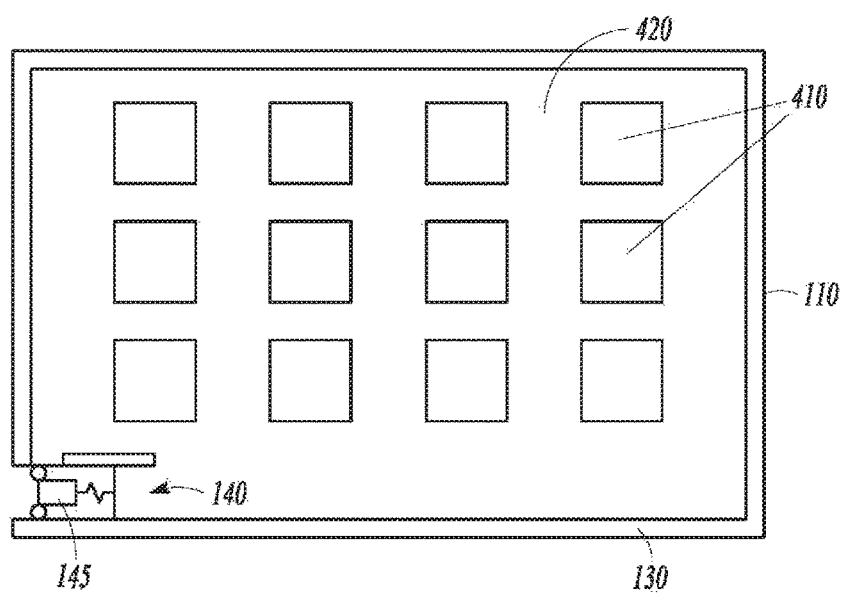
FIG. 4 is a block diagram top view of an array of hydrogen transport channels in a replaceable fuel cartridge according to an example embodiment.

FIG. 4 is a top cross section view of the fuel cartridge 110 illustrating channel 140 in further detail. The channel 140 in one embodiment comprises a number of supports 410 spread apart to both provide adequate support for filter 135 and fuel 115. The supports 410 result in an array of passages 420 running between the support 410, all feeding hydrogen to the channel 140 and valve 145.

Figure 5:
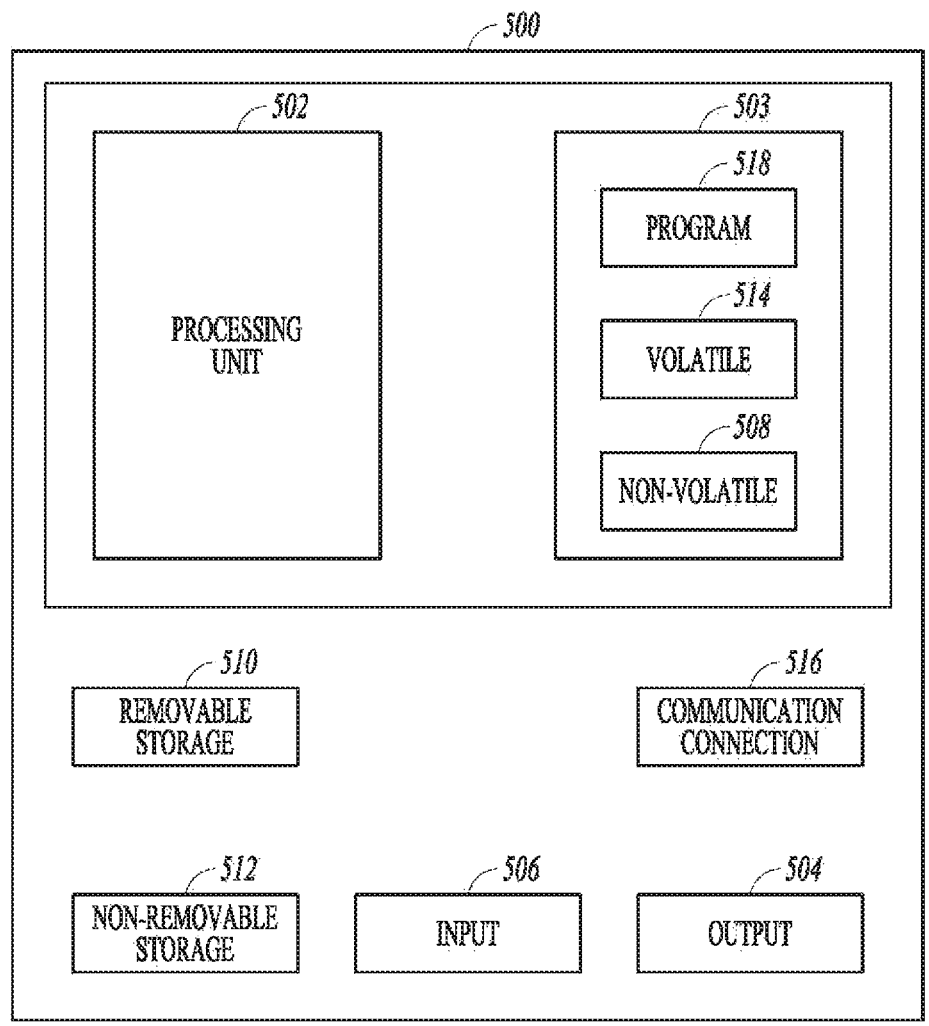
FIG. 5 is a block diagram illustrating operation of fuel cartridge valve interacting with a power generator according to an example embodiment.

FIG. 5 is a block schematic diagram of a computer system 500 to implement control electronics according to an example embodiment. The computer system 500 may also take the form of an integrated circuit or commercially available microprocessor or microcontroller having fewer components than shown in FIG. 5. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A device comprising:
   a case having a cavity with perforations on a portion of the case adapted to allow passage of water vapor into the cavity;
   a water vapor responsive hydrogen producing fuel disposed within the cavity of the case;
   a selective gas impermeable water vapor permeable membrane disposed between the fuel and the perforations in the case to allow passage of water vapor; and
   a valve disposed at an end of the case to controllably allow hydrogen to flow outside the case.
2. The device of example 1 wherein the fuel comprises a chemical hydride.
3. The device of example 2 wherein the fuel further comprises a metal hydride.
4. The device of any of examples 1-3 wherein the selective gas impermeable membrane is impermeable to $H_2$, $N_2$, and $O_2$.
5. The device of any of examples 1-4 and further comprising:
   a gas permeable particulate filter; and
   a hydrogen transport channel coupled between the filter and a wall of the case to transport hydrogen to the valve positioned at an end of the transport channel.
6. The device of example 5 wherein the transport channel comprises an array of passages between supports that support the particular filter.
7. The device of any of examples 1-6 and further comprising a tear-away gas impermeable foil disposed on an outside surface of the portion of the case having openings to prevent passage of gas to the fuel prior to insertion of the device in a power generator.
8. The device of any of examples 1-7 and further comprising a power generator having a power generator cavity adapted to receive the case, open the valve, transport hydrogen to a fuel cell, and transport water vapor from the fuel cell to the openings in the case.
9. The device of example 8 wherein the power generator further comprises:
   a selectively gas impermeable membrane positioned between the fuel cell and the power generator cavity; and
   an exhaust valve positioned between the fuel cell and the selectively gas impermeable membrane to controllable exhaust gas.
10. The device of example 9 wherein the power generator further comprises:
    a sensor; and
    a controller coupled to the sensor and to the exhaust valve to control the exhaust valve responsive to signals from the sensor.
11. A power generator comprising:
    a power generator cavity adapted to receive a fuel cartridge;
    a protrusion disposed with in the cavity to engage a check valve of the fuel cartridge;
    a fuel cell to convert hydrogen and oxygen to electricity and to generate water vapor; and
    a passage to transport hydrogen from the cavity to the fuel cell and water vapor to the cavity.
12. The power generator of example 11 and further comprising:
    a selective gas impermeable membrane positioned between the fuel cell and the power generator cavity; and
    an exhaust valve positioned between the fuel cell and the selectively gas impermeable membrane to controllable exhaust gas.
13. The power generator of example 12 and further comprising:
    a sensor; and
    a controller coupled to the sensor and to the exhaust valve to control the exhaust valve responsive to signals from the sensor.
14. The power generator of any of examples 12-13 wherein the selective gas impermeable membrane is impermeable to H2, N2, and O2.
15. A method comprising:
    removing a tear-away gas impermeable foil from a hydrogen producing fuel cartridge to expose to a water vapor permeable, gas impermeable membrane separating a hydrogen producing fuel from ambient;
    inserting the hydrogen producing fuel cartridge into a power generator cartridge cavity; and
    opening a valve in the fuel cartridge when inserting the cartridge into the cavity to form a passage for hydrogen from the fuel cartridge to flow to a fuel cell in the power generator.
16. The method of example 15 and further comprising forming a seal between the passage and the inserted fuel cartridge.

17. The method of any of examples 15-16 and further comprising:
   sensing a parameter in the power generator; and
   controlling an exhaust valve coupled to the passage responsive to the sensed parameter.
18. The method of example 17 wherein the parameter comprises temperature.
19. The method of any of examples 17-18 wherein the parameter comprises pressure.
20. The method of any of examples 15-19 and further comprising providing water vapor from the fuel cell to the fuel cartridge via a water vapor permeable gas impermeable membrane disposed between the fuel cell and the fuel cartridge.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
   a planar case having a cavity, the cavity having an upper surface, a lower surface opposite the upper surface, a first side joining the upper surface and the lower surface, and an open second side opposite the first side, the upper surface including perforations adapted to allow passage of water vapor;
   a water vapor responsive hydrogen producing fuel disposed within the cavity of the planar case;
   a first hydrogen impermeable water vapor permeable membrane disposed between the water vapor responsive hydrogen producing fuel and the perforations in the planar case to direct passage of water vapor from ambient to the cavity;
   a case channel disposed along the lower surface of the cavity, the case channel arranged to transport hydrogen generated by the water vapor responsive hydrogen producing fuel within the cavity along the lower surface of the cavity to the first side of the cavity; and
   a hydrogen transport channel disposed along the first side and the upper surface of the cavity to transport hydrogen from the case channel along the hydrogen transport channel to convert the hydrogen and oxygen from ambient air to electricity and to generate water vapor;
   a second hydrogen impermeable water vapor permeable membrane disposed along a lower surface of the hydrogen transport channel and along an upper surface of the cavity to direct water vapor generated by the fuel cell to the cavity;
   and further comprising an exhaust valve positioned between the fuel cell and the second hydrogen impermeable water vapor permeable membrane to controllably exhaust gas.

2. The device of claim 1 wherein the fuel comprises a chemical hydride.

3. The device of claim 2 wherein the fuel further comprises a metal hydride.

4. The device of claim 1 wherein the first hydrogen impermeable membrane is further impermeable to $N_2$ and $O_2$.

5. The device of claim 1 and further comprising:
   a fuel valve disposed at an end of the case channel to controllably allow hydrogen to flow outside the cavity;
   a gas permeable particulate filter disposed between the fuel and the case channel.

6. The device of claim 1 wherein the case channel comprises an array of passages between supports that support the particulate filter.

7. The device of claim 1 and further comprising:
   a sensor; and
   a controller coupled to the sensor and to the exhaust valve to control the exhaust valve responsive to signals from the sensor.

* * * * *